United States Patent [19]
Kelley et al.

[11] Patent Number: 6,000,033
[45] Date of Patent: Dec. 7, 1999

[54] PASSWORD CONTROL VIA THE WEB

[75] Inventors: Edward E. Kelley, Wappingers Falls; Norman J. Dauerer; John U. Knickerbocker, both of Hopewell Junction, all of N.Y.

[73] Assignee: International Business Machines Corporation, Armonk, N.Y.

[21] Appl. No.: 08/978,919

[22] Filed: Nov. 26, 1997

[51] Int. Cl.⁶ .............................. G06F 11/00; G06F 13/14
[52] U.S. Cl. ......................... 713/201; 713/200; 713/202; 709/225; 709/227
[58] Field of Search .................................. 713/201, 202, 713/200; 709/225, 227

[56] References Cited

U.S. PATENT DOCUMENTS

| | | | |
|---|---|---|---|
| 4,763,356 | 8/1988 | Day, Jr. et al. | 379/368 |
| 5,530,759 | 6/1996 | Braudaway et al. | 380/54 |
| 5,581,700 | 12/1996 | Witte | 713/202 |
| 5,647,056 | 7/1997 | Barrett et al. | 395/200.1 |
| 5,684,950 | 11/1997 | Dare et al. | 713/201 |
| 5,696,898 | 12/1997 | Baker et al. | 713/201 |
| 5,790,785 | 8/1998 | Klug et al. | 713/202 |
| 5,826,016 | 10/1998 | Ito et al. | 713/202 |
| 5,881,225 | 3/1999 | Worth | 713/200 |

OTHER PUBLICATIONS

Cannon Internet Web Page, www.ccsi.canon.com/webrecord/Apr. 24, 1997.

IBM Technical Disclosure Bulletin. "Temporary Global Passwords", vol. 26, No. 03, Mar. 1993;. pp. 451–453.

IBM Technical Disclosure Bulletin, "Resource Access Control Facility Password Propagation for Multiple Virtual Storage", vol. 36, No. 06B, Jun. 1993.

IBM Technical Disclosure Bulletin, "Network Signon Coordination Configuration", vol. 36, No. 12, Dec. 1993.

*Primary Examiner*—Robert W. Beausoliel, Jr.
*Assistant Examiner*—Christopher A Revak
*Attorney, Agent, or Firm*—DeLio & Peterson LLC; Peter W. Peterson; Aziz M. Ahsan

[57] ABSTRACT

A system and process for providing passwords from a client computer to different servers, databases and applications and other services accessed on and inter- or intra-net. A program storage device has a reference table having a listing of a plurality of services accessible on an inter- or intra-net, a real password associated with each of the services, a variable name for the real password used by each of the services to enter the real password associated therewith, and a virtual password corresponding to a desired group of the services and associated real passwords. A desired service listed on the desired group of services in the reference table is selected for access and the virtual password corresponding to the desired group of services is entered to begin access. The variable name for the real password associated with the desired service is found on the reference table, and the variable name for the real password is used to enter the real password for the desired service to gain access to the desired service. There is further provided a first virtual password corresponding to a first group of the services and associated real passwords and a second virtual password corresponding to a second group of the services and associated real passwords. The desired group of services may then be selected using the first or second virtual password.

20 Claims, 3 Drawing Sheets

PASSWORD CONTROL VIA THE WEB

BACKGROUND OF THE INVENTION

1. Field of the Invention

The present invention relates to computer programs and in particular to software for providing passwords from a client computer to different servers, databases and applications and other services accessed on and inter- or intra-net.

2. Description of Related Art

As computer users operate in a more "network centric" environment, they will be logging on to more and more servers, accessing more and more data bases and applications all through a web interface on our personal computers or network computers. This presents two problems with using passwords.

A first problem is that there may be different passwords on each server, data base or application. The user's intention may be to have all of the passwords be the same password of each server, data base or application but this is not always possible because each server, data base or application may have different naming conventions for their passwords. This means that the user is faced with the problem of having to deal with multiple passwords to access servers, data bases and applications.

A second problem is that there are different expiration times for passwords issued for different servers, data bases and applications. Thus, maintaining all of these passwords become cumbersome.

IBM Technical Disclosure Bulletin Vol. 36, No. 3 (March 1993) entitled "Temporary Global Passwords" discloses the use of a temporary global password which is utilized after a user logs on to a terminal with an authenticated one-time password token. There is no disclosure of discrimination of service access among different users, and the users never see the assigned temporary global password.

Accordingly, there is a need for a universal password system which can differentiate among different user groups to supply the real passwords for access to the network services for which the user groups are authorized.

Bearing in mind the problems and deficiencies of the prior art, it is therefore an object of the present invention to provide a process and system for providing passwords from a client computer to different servers, databases and applications and other services accessed on and inter- or intra-net.

It is another object of the present invention to provide such a process and system wherein a universal or virtual password can be assigned which would activate the real password for the authorized network system being accessed.

A further object of the invention is to provide a universal password system which can differentiate among different user groups with regard to authorized access to the various network services which may be accessed by a single client computer.

It is yet another object of the present invention to provide such a process and system accessible by the client computer to change the real passwords associated with each of the network services.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a process for providing passwords from a client computer to different servers, databases and applications and other services accessed on and inter- or intra-net. There is first provided a reference table having a listing of a plurality of services accessible on an inter- or intra-net and a real password associated with each of the services. A first virtual password is assigned corresponding to a first group of the services and associated real passwords and the first virtual password is provided to a first group of users of the client computer. A second virtual password is assigned corresponding to a second group of the services and associated real passwords and the second virtual password is provided to a second group of users of the client computer. The second group of the services are different from the first group of the services, the second virtual password is different from the first virtual password and the second group of users is different from the first group of users. A desired one of the services on an inter- or intra-net is accessed from the client computer by using one of the first or second virtual passwords assigned to the group of the desired service. Upon use of the assigned virtual password, the reference table is used by the client computer to substitute the real password associated with the desired service for the assigned virtual password. The step of accessing the desired service is normally performed after the steps of assigning the respective first and second virtual passwords.

The real password provided may include a user identification and the reference table may be provided on a program storage device.

Preferably, there is provided on a program storage device accessible by a client computer a reference table having a listing of a plurality of services accessible on an inter- or intra-net and a real password associated with each of the services, and the reference table is accessible by the client computer to change the real passwords associated with each of the services.

Also, accessing a desired one of the services on an inter- or intra-net from the client computer may be by one of the first group of users using the first virtual password assigned to the group of the desired service, such that upon use of the assigned first virtual password, the reference table is used by the client computer to substitute the real password associated with the desired service for the assigned first virtual password. A desired another one of the services on an inter- or intra-net from the client computer may be accessed by one of the second group of users using the second virtual password assigned to the group of the another desired service, such that upon use of the assigned second virtual password, the reference table is used by the client computer to substitute the real password associated with the desired service for the assigned second virtual password.

In a related aspect, the present invention provides a process for providing passwords from a client computer to different servers, databases and applications and other services accessed on and inter- or intra-net. There is first provided on a program storage device a reference table having a listing of a plurality of services accessible on an inter- or intra-net, a real password associated with each of the services, a variable name for the real password used by each of the services to enter the real password associated therewith, and a virtual password corresponding to a desired group of the services and associated real passwords. The method comprises the steps of first selecting a desired service listed on the desired group of services in the reference table for access on the inter- or intra-net and entering the virtual password corresponding to desired the group of services to begin access to the desired service on the inter- or intra-net. The method then includes the steps of finding the variable name for the real password associated with the desired service on the reference table, and using the variable name for the real password to enter the real password for the desired service to gain access to the desired service.

The preferred method includes providing on the reference table for the services accessible on an inter- or intra-net user identifications for the services and variable names for each of the user identifications used by the services to enter the user identifications associated therewith. The preferred method then includes the steps of finding the variable name for the user identification associated with the desired service on the reference table, and using the variable name for the user identification to enter the real password for the desired service to gain access to the desired service. As before, the real passwords may include user identifications.

More preferably, there is provided a first virtual password corresponding to a first group of the services and associated real passwords and a second virtual password corresponding to a second group of the services and associated real passwords. The second group of the services is different from the first group of the services and the second virtual password is different from the first virtual password. The desired group of services may then be selected using the first or second virtual password.

In another aspect, the present invention relates to a system for providing passwords from a client computer to different servers, databases and applications and other services accessed on and inter- or intra-net. The system comprises a program storage device accessible by the client computer including a reference table having a listing of a first and second group of services accessible on an inter- or intra-net and a real password associated with each of the services. The second group of the services is different from the first group of the services. A first virtual password corresponds to a first group of the services and associated real passwords and a second virtual password corresponds to a second group of the services and associated real passwords, wherein the second virtual password is different from the first virtual password. A desired one of the services on an inter- or intra-net may be accessed from the client computer by using one of the first or second virtual passwords assigned to the group of the desired service, and upon use of the assigned virtual password, the reference table is adapted to be used by the client computer to substitute the real password associated with the desired service for the assigned virtual password.

The reference table is adapted to be accessible by the client computer to change the real passwords associated with each of the services, and the real password may include a user identification.

In a further aspect, the present invention provides a system for providing passwords from a client computer to different servers, databases and applications and other services accessed on and inter- or intra-net. The system comprises a program storage device accessible by the client computer including a reference table having a listing of a plurality of services accessible on an inter- or intra-net, a real password associated with each of the services, a variable name for the real password used by each of the services to enter the real password associated therewith, and a virtual password corresponding to a desired group of the services and associated real passwords. There is also included means for selecting a desired service listed on the desired group of services in the reference table for access on the inter- or intra-net, and means for entering the virtual password corresponding to the desired group of services to begin access to the desired service on the inter- or intra-net. The system also includes means for finding the variable name for the real password associated with the desired service on the reference table and means for using the variable name for the real password to enter the real password for the desired service to gain access to the desired service. The means for entering the virtual password may be provided in a web browser on the program storage device.

Preferably, the system further includes on the reference table for the services accessible on an inter- or intra-net user identifications for the services and variable names for each of the user identifications used by the services to enter the user identifications associated therewith. The system may further include means for finding the variable name for the user identification associated with the desired service on the reference table and means for using the variable name for the user identification to enter the real password for the desired service to gain access to the desired service.

More preferably, the system includes in the reference table a first virtual password corresponding to a first group of the services and associated real passwords and a second virtual password corresponding to a second group of the services and associated real passwords. The second group of the services being different from the first group of the services and the second virtual password is different from the first virtual password.

In yet another aspect, the present invention provides a program storage device readable by a machine, tangibly embodying a database accessible by the client computer including a reference table having a listing of a plurality of services accessible on an inter- or intra-net, a real password associated with each of the services, a variable name for the real password used by each of the services to enter the real password associated therewith, and a virtual password corresponding to a desired group of the services and associated real passwords. The program storage device further has a program of instructions executable by the machine to perform a method of providing passwords from a client computer to different servers, databases and applications and other services accessed on and inter- or intra-net. The method comprises the steps of connecting the client computer to a desired service listed on the desired group of services in the reference table for access on the inter- or intra-net and receiving input of the virtual password corresponding to the desired group of services to begin access to the desired service on the inter- or intra-net. The method then includes the steps of finding the variable name for the real password associated with the desired service on the reference table and using the variable name for the real password to enter the real password for the desired service to gain access for the client computer to the desired service.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENTS(S)

Figure 1:
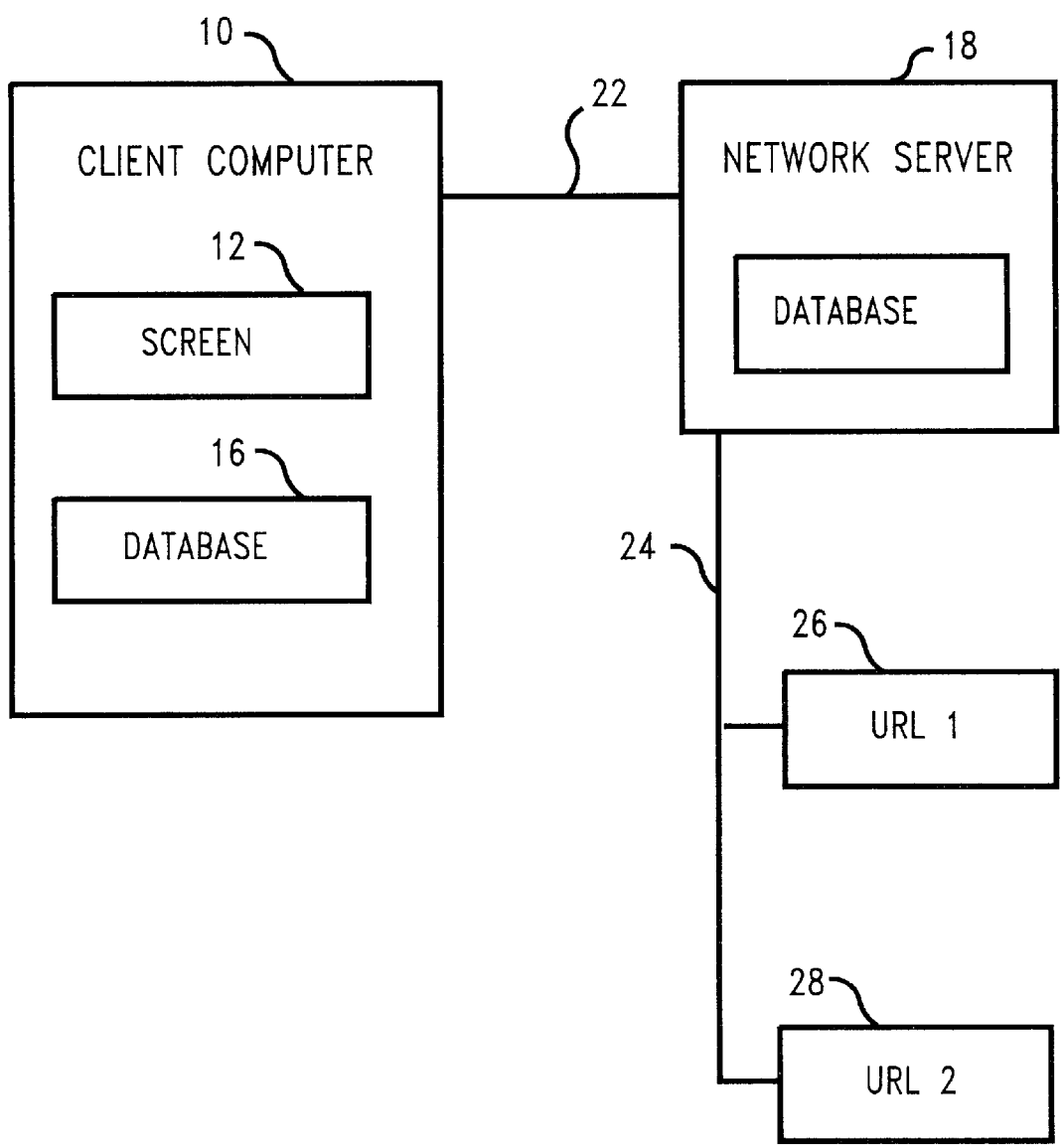
FIG. 1 is a schematic of the system of the present invention for providing passwords from a client computer to different servers, databases and applications and other services accessed on and inter- or intra-net.

In describing the preferred embodiment of the present invention, reference will be made herein to FIGS. 1–3 of the drawings in which like numerals refer to like features of the invention. Features of the invention are not necessarily shown to scale in the drawings.

The present invention provides a web approach in which a person using a web client would have one virtual password and/or user identification (userid) combination for all of the servers, data bases and applications that are accessed. This virtual userid and password combination would translate to the "real" password and/or userid required by the selected server, data base or application. The web client would, upon discovering that password and/or userid, is required to access a server, data base or application, would enter a virtual password in place of the real password and/or userid and the invention would look up the URL in a table and pass the real password and/or userid and password and provide the requested access to the server, data bases or applications.

Also, within the context of virtual password control, the ability to allow for different security levels is provided with this invention. What this means is that a subset of our web client access can be shared with someone without giving that person access to all of the servers, data bases and applications. The user can be given a restricted universal password which would allow only access to certain servers, data bases and applications.

The present invention also permits the user at the web client to be able to maintain passwords on the various servers, data bases or application.

Definitions relevant to the present invention are as follows:
HTML: Hypertext Markup Language
HTML source file: File with the HTML tags to be converted by a web browser to be displayed on a monitor
Web Page: HTML source file converted and displayed on a web browser or any screen generated by a program that is displayed on a web browser
URL (Uniform Resource Locator): A text string that indicates the server protocol to use in accessing the resource, the internet domain name of the server, and the name and location of the resource on that particular server
Level: The hierarchy of HTML files that are associated with a URL. For example, a level of 3 means that a URL is selected from an HTML file, another URL is selected when the first prior selected URL is presented then another URL is selected.
Virtual password: A password known by a user at a client that is used in place of a real password and/or userid that is required to access an application, system, data base or file.
Password alias file: The file containing a virtual password, an associated list of real passwords and/or user ids in the HTML source file that is used by an application, system, data base or file that requires a password and/or userid and the associated URL of the application, system, data base or file. There can be a plurality of different virtual passwords and corresponding lists of real passwords and/or userids and variable names for each real password and/or userid. This feature is used to allow different security levels to be shared. A user may share a virtual password and the associated list of real passwords and userids, where the associated list of real passwords and userids is a subset of the total access authority that a user possessed. The password alias also contains the name of the password program that is used to change the real password.
Password program: A file that contains a program and the URL and the HTML source file provided by the URL that is used to supply a new password to an application, system, data base or file. The program will provide the HTML source file to the browser and send the output to the server to have the password changed.

A typical client/network system is illustrated in FIG. 1. Client computer 10 is linked by telephone or other network cable 22 to a network server computer 18. Such server or database may be on the Internet or on an intranet system. Client computer 10 has a microprocessor for executing stored programs and includes a database 16 on its program storage device for storage of passwords used to access inter- or intra-net services, such as an Internet or other network service provider, and specific HTML web pages and other files and applications which may or may not be downloaded from the network service provider. Web sites, applications or files 26, 28 have different addresses (URLs) different real passwords, and are accessible over network cable 24 through network server 18. As will be explained further, database 16 contains the reference table which contains and applies the common, virtual passwords entered by the client computer user in place of the real password, and then substitutes the real password when the service is accessed. Preferably, database 16 is physically present in the client computer, but it may be located elsewhere, so long as the client computer has access to the information therein. A screen 12 is able to display the desired web pages or other files and services accessed from the network.

The computer program or software incorporating the process steps and instructions described further below may be stored in both the client computer(s) and network server on an otherwise conventional program storage device, such as a semiconductor chip, a read-only memory, or magnetic media such as a diskette or computer hard drive, which is readable and executable by a computer in conjunction with a web browser such as Netscape Navigator.

Table 1 below contains an example of the various virtual passwords which may be assigned to different groups of users to substitute for the real passwords of the network services. Such table may be located in the client computer database to control access to the listed services.

TABLE 1

| Network Service | Real Password | Virtual Passwd 1' | Passwd 2 | Real Userid | Virtual Variable Password | Variable Userid |
|---|---|---|---|---|---|---|
| Internet Provider http://aaa.bbb.com | aaaaa | xyz | rst | | vp1 | vi1 |
| Database http://bbb.ddd.com | bbbb | | rst | | vp2 | vi2 |
| Spread sheet http://ccc.rrr.com | ccccccc | | rst | | vp3 | vi3 |
| Subscription Web Site http://ddd.qqq.com | dddddd | xyz | | ffff | vp4 | vi4 |

Each network service, such as an Internet connection provider, a database on the network, a spreadsheet application, and a paid subscription web site, has a real password which must be entered and validated by the service proprietor before access is permitted to user on the client computer. In accordance with the present invention, a first virtual password "xyz" is assigned to a first group of the listed services. This first virtual password would be supplied to a first group of users authorized to access the internet connection provider and subscription web site services. This first group of users would not have access to the database and spreadsheet services. A second virtual password "rst" is assigned to a second group of the listed services. This second virtual password would be supplied to a second group of users authorized to access the internet connection provider, database and spreadsheet services. This second group of users would not have access to the subscription web site service.

Table 1 also includes for each network service the variable name for each real password in the HTML source file that is used by a network service application, system, data base or file that requires a password and the associated URL of the application, system, data base or file. Since many or even most network services also require a userid, Table 1 shows for each network service a real userid as well as the variable name for each userid in the HTML source file that is used by a network service.

When a request is made to the client computer for a password and/or userid on a web browser to gain access to an application, system, data base or file on a network service, the user at the client computer may utilize the options section of a web browser to substitute the virtual password. The user then selects the options section which is modified to include an option to bring up a window to substitute a virtual password. The virtual password is entered and the window is closed. Then, the program finds the URL that presented the HTML source file to the browser and requested the password and userid. The URL is used to find the variable names for the password and/or userid in the password alias file. The process then writes the real password and/or userid in the HTML source file that requested the password and/or userid.

Any number of different virtual passwords may be used to allocate authorized services among different users and user groups. The services authorized by each virtual password may overlap or may be mutually exclusive with other services authorized by other virtual passwords.

Figure 2:
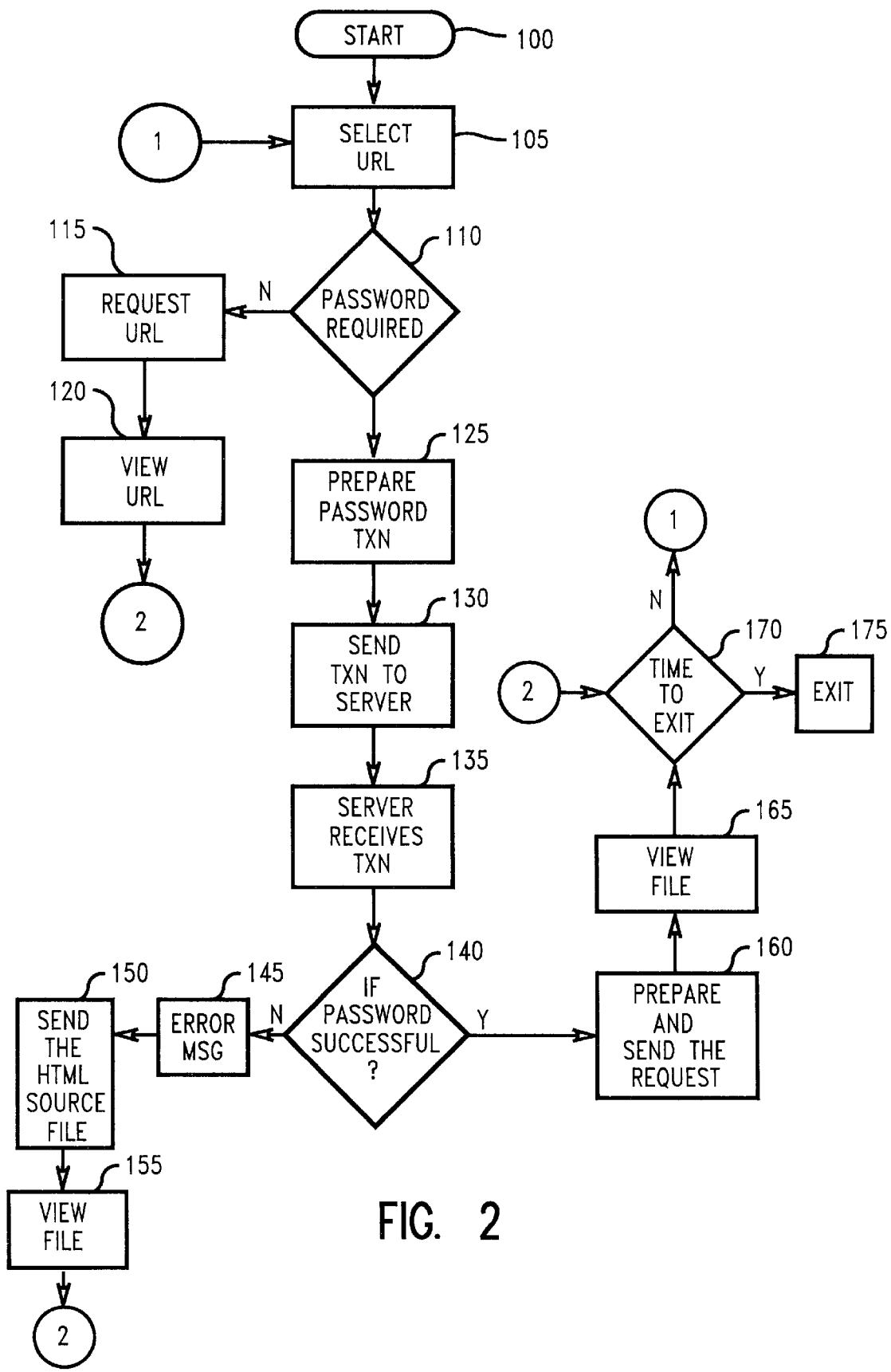
FIGS. 2 and 3 are block diagram flow charts of the preferred steps employed in practicing the present invention, wherein circled numerals indicate links between the steps.
Figure 3:
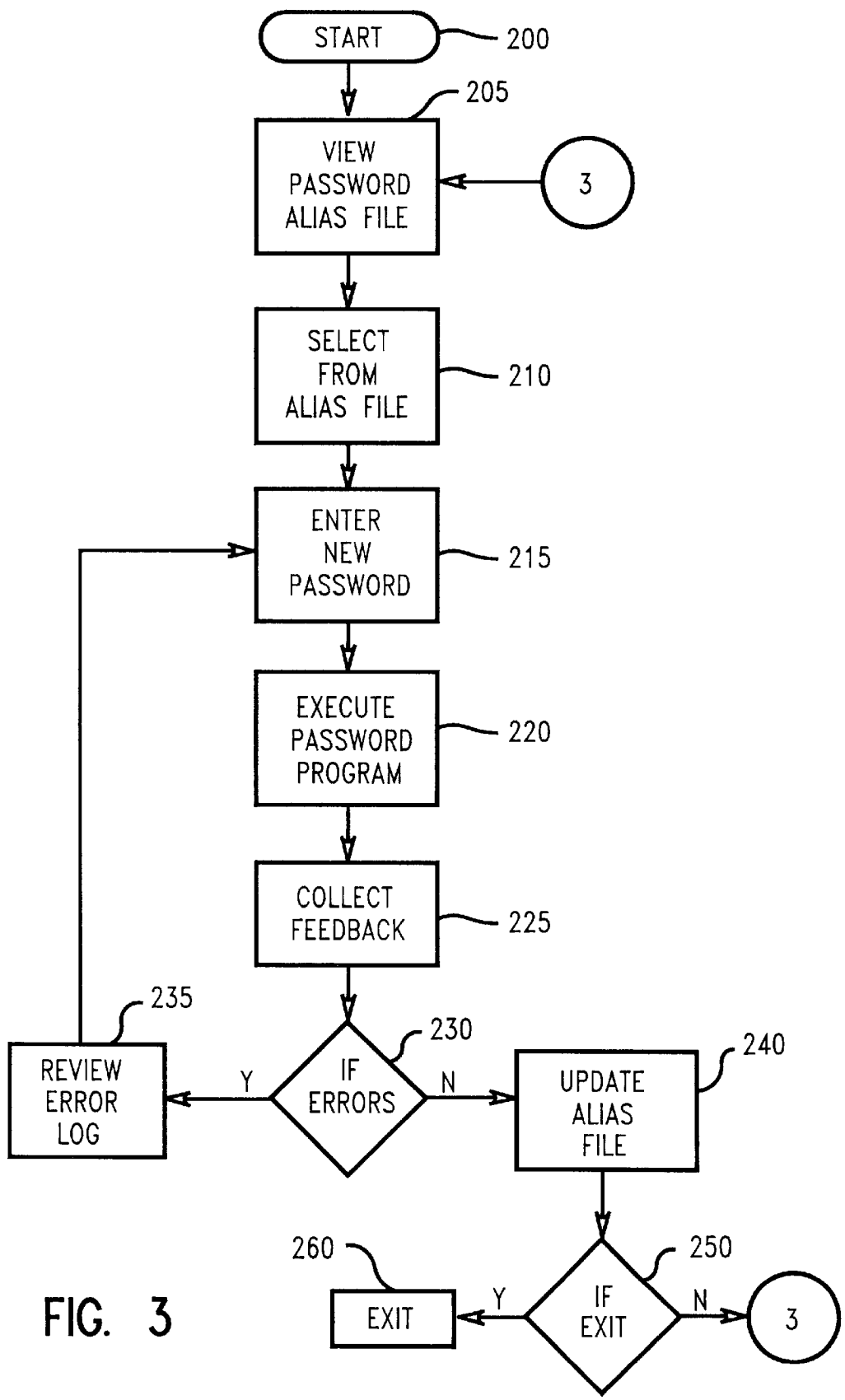

Flow charts of the process used in the present invention are shown in FIGS. 2 and 3. Numerals in circles indicate connections to and from other parts of the flow chart. FIG. 2 illustrates the password transaction process between the client computer and the network service, and the flow chart description is as follows:

| | |
|---|---|
| 100 | Start the process. |
| 105 | Select the URL. Select a URL in a web browser that will provide access to an application, system, data base or file. |
| 110 | password required? Is a password required for this URL. |
| 115 | Request URL. The web browser will request the URL and process the URL and present it for viewing on the web browser. |
| 120 | View the URL. View the output of the application, system, data base or file on the web browser. |
| 125 | Prepare password txn. Prepare the password transaction and send the transaction to the server. When a request is made for a password and/or userid on a web browser to gain access to an application, system, data base or file, |
| | the user at the client can substitute the virtual password by selecting the options section of a web browser. In the options section is included an option to bring up a window to substitute a virtual password. The virtual password is entered and the window is closed. Then, the process finds the URL that presented the HTML source file to the browser and requested the password and userid. The URL is used to find the variable names for the password and/or userid in the password alias file. The process then writes the real password and/or userid in the HTML source file that requested the password and/or userid. |
| 130 | Send txn to server. Send the password transaction to the server after the process included the real password and/or userid in the HTML source file that requested the real password and/or userid. |
| 135 | Server receives the txn. The server receives the password transaction. |
| 140 | Is password successful? Did the virtual password successfully gain access to the application, system, data base or file on the web browser? |
| 145 | Error msg. An error message is prepared by the server if the virtual password was unsuccessful in gaining access to the application, system data base or file. |
| 150 | Send the HTML source file. The server sends the HTML source file that contains the error message to the web client. |
| 155 | View file. The web browser displays error message. |
| 160 | Prepare and send the request. The server prepares and gives access to the application, system, data base or file. |
| 165 | View file. The web browser displays access to the application, system, data base or file. |
| 170 | Time to exit? Time to exit the process? |
| 175 | Exit. Exit the process. |

FIG. 3 illustrates the virtual password maintenance process at the client computer, and the flow chart description is as follows:

| | |
|---|---|
| 200 | Start the password maintenance process. |
| 205 | View password alias file. |
| 210 | Select from alias file. Select a password and userid combination from the password alias file. |
| 215 | Enter new password. This is used to change a real password on an application, system, data base or file. |
| 220 | Execute password program. Execute the password program that was found on the password alias file. This will change the selected password for the application, system, data base or file. |
| 225 | Collect feedback. Collect the feedback for the password program. |
| 230 | If errors? Were there any errors in the password program or was the password program successfully updated? |
| 235 | Review error log. Review the error log for errors that were the result of problems with the password program. |
| 240 | Update alias file. Update the password alias file with the new password. |
| 250 | If exit? Time to exit? |
| 260 | Exit |

Accordingly, it is shown that the present invention provide an efficient process and system for providing passwords from a client computer to different servers, databases and applications and other services accessed on and inter- or intra-net. The invention permits a universal or virtual password to be assigned which activates the real password for the authorized network system being accessed. The password system can differentiate among different user groups with regard to authorized access to the various network services which may be accessed by a single client computer, and is accessible by the client computer to change the real passwords associated with each of the network services.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A process for providing passwords from a client computer to different servers, databases and applications and other services accessed on and inter- or intra-net comprising the steps of:
   a) providing a reference table having a listing of a plurality of services accessible on an inter- or intra-net and a real password associated with each of said services;
   b) assigning a first virtual password corresponding to a first group of said services and associated real passwords;
   c) providing said first virtual password to a first group of users of said client computer;
   d) assigning a second virtual password corresponding to a second group of said services and associated real passwords, said second group of said services being different from said first group of said services and said second virtual password being different from said first virtual password;
   e) providing said second virtual password to a second group of users of said client computer, said second group of users being different from said first group of users; and
   f) accessing a desired one of said services on an inter- or intra-net from said client computer by using one of said first or second virtual passwords assigned to the group of said desired service, whereby upon use of the assigned virtual password, said reference table is used by said client computer to substitute the real password associated with said desired service for the assigned virtual password.

2. The process of claim 1 wherein said step (f) of accessing said desired service is performed after said steps (b) and (d) of assigning said respective first and second virtual passwords.

3. The process of claim 1 wherein said step (a) comprises providing on a program storage device accessible by a client computer a reference table having a listing of a plurality of services accessible on an inter- or intra-net and a real password associated with each of said services, said reference table being accessible by said client computer to change the real passwords associated with each of said services.

4. The process of claim 1 wherein said step (f) of accessing a desired one said services on an inter- or intra-net from said client computer is by one of said first group of users using said first virtual password assigned to the group of said desired service, whereby upon use of the assigned first virtual password, said reference table is used by said client computer to substitute the real password associated with said desired service for the assigned first virtual password, and further including the step of accessing a desired another one said services on an inter- or intra-net from said client computer by one of said second group of users using said second virtual password assigned to the group of said another desired service, whereby upon use of the assigned second virtual password, said reference table is used by said client computer to substitute the real password associated with said desired service for the assigned second virtual password.

5. The process of claim 1 wherein said real password provided in step (a) includes a user identification.

6. The process of claim 1 wherein in step (a) said reference table is provided on a program storage device.

7. A process for providing passwords from a client computer to different servers, databases and applications and other services accessed on and inter- or intra-net comprising the steps of:
   a) providing on a program storage device a reference table having a listing of a plurality of services accessible on an inter- or intra-net, a real password associated with each of said services, a variable name for said real password used by each of said services to enter the real password associated therewith, and a virtual password corresponding to a desired group of said services and associated real passwords;
   b) selecting a desired service listed on said desired group of services in said reference table for access on said inter- or intra-net;
   c) entering said virtual password corresponding to desired said group of services to begin access to said desired service on said inter- or intra-net;
   d) finding the variable name for the real password associated with said desired service on said reference table; and
   e) using said variable name for the real password to enter the real password for said desired service to gain access to said desired service.

8. The process of claim 7 further including in step (a) providing on said reference table for said services accessible on an inter- or intra-net user identifications for said services and variable names for each of said user identifications used by said services to enter the user identifications associated therewith, and further including the steps of:
   f) finding the variable name for the user identification associated with said desired service on said reference table; and
   g) using said variable name for the user identification to enter the real password for said desired service to gain access to said desired service.

9. The process of claim 7 wherein said real passwords provided in step (a) include user identifications.

10. The process of claim 7 wherein in step (a) there is provided a first virtual password corresponding to a first group of said services and associated real passwords and a second virtual password corresponding to a second group of said services and associated real passwords, said second group of said services being different from said first group of said services and said second virtual password being different from said first virtual password, and wherein in step (b) said desired group of services is selected from said first or second group of services.

11. A system for providing passwords from a client computer to different servers, databases and applications and other services accessed on and inter- or intra-net comprising:
   a program storage device accessible by said client computer including a reference table having a listing of a first and second group of services accessible on an inter- or intra-net and a real password associated with each of said services, said second group of said services being different from said first group of said services;

a first virtual password corresponding to a first group of said services and associated real passwords; and a second virtual password corresponding to a second group of said services and associated real passwords, said second virtual password being different from said first virtual password, whereby a desired one of said services on an inter- or intra-net may be accessed from said client computer by using one of said first or second virtual passwords assigned to the group of said desired service, and upon use of the assigned virtual password, said reference table is adapted to be used by said client computer to substitute the real password associated with said desired service for the assigned virtual password.

12. The system of claim 11 wherein said reference table is adapted to be accessible by said client computer to change the real passwords associated with each of said services.

13. The system of claim 11 wherein said real password includes a user identification.

14. A system for providing passwords from a client computer to different servers, databases and applications and other services accessed on and inter- or intra-net comprising:

a program storage device accessible by said client computer including a reference table having a listing of a plurality of services accessible on an inter- or intra-net, a real password associated with each of said services, a variable name for said real password used by each of said services to enter the real password associated therewith, and a virtual password corresponding to a desired group of said services and associated real passwords;

means for selecting a desired service listed on said desired group of services in said reference table for access on said inter- or intra-net;

means for entering said virtual password corresponding to desired said group of services to begin access to said desired service on said inter- or intra-net;

means for finding the variable name for the real password associated with said desired service on said reference table; and means for using said variable name for the real password to enter the real password for said desired service to gain access to said desired service.

15. The system of claim 14 further including on said reference table for said services accessible on an inter- or intra-net user identifications for said services and variable names for each of said user identifications used by said services to enter the user identifications associated therewith.

16. The system of claim 15 further including:

means for finding the variable name for the user identification associated with said desired service on said reference table; and means for using said variable name for the user identification to enter the real password for said desired service to gain access to said desired service.

17. The system of claim 14 wherein said real passwords include user identifications.

18. The system of claim 14 wherein there is included in said reference table a first virtual password corresponding to a first group of said services and associated real passwords and a second virtual password corresponding to a second group of said services and associated real passwords, said second group of said services being different from said first group of said services and said second virtual password being different from said first virtual password.

19. The system of claim 14 wherein said means for entering said virtual password is provided in a web browser on said program storage device.

20. A program storage device readable by a machine, tangibly embodying a database accessible by a client computer, including a reference table having a listing of a plurality of services accessible on an inter- or intra-net, a real password associated with each of said services, a variable name for said real password associated with each of said services to enter the real password associated therewith, and a virtual password corresponding to a desired group of said services and associated real passwords, said program storage device further having a program containing instructions executable by the machine to perform a method of providing passwords from a client computer to different servers, databases and applications and other services accessed on and inter- or intra-net, said method comprising the steps of:

a) connecting said client computer to a desired service listed on said desired group of services in said reference table for access on said inter- or intra-net;

b) receiving input of said virtual password corresponding to desired said group of services to begin access to said desired service on said inter- or intra-net;

c) finding the variable name for the real password associated with said desired service on said reference table; and d) using said variable name for the real password to enter the real password for said desired service to gain access for said client computer to said desired service.

* * * * *